Sept. 15, 1970    R. ERNST ETAL    3,528,126
CONTINUOUS PRODUCTION APPARATUS FOR HARD CORE FOAM
PLATES HAVING RIGID COVER LAYERS PARTICULARLY
ON A POLYURETHANE BASE
Filed July 26, 1968    4 Sheets-Sheet 1

INVENTORS:
RUDOLF ERNST AND
KARL-JOSEF KRAFT
BY
AGT.

Sept. 15, 1970 R. ERNST ETAL 3,528,126
CONTINUOUS PRODUCTION APPARATUS FOR HARD CORE FOAM
PLATES HAVING RIGID COVER LAYERS PARTICULARLY
ON A POLYURETHANE BASE
Filed July 26, 1968 4 Sheets-Sheet 2

DETAIL of FIG. 2A

United States Patent Office 3,528,126
Patented Sept. 15, 1970

3,528,126
CONTINUOUS PRODUCTION APPARATUS FOR HARD CORE FOAM PLATES HAVING RIGID COVER LAYERS PARTICULARLY ON A POLYURETHANE BASE
Rudolf Ernst, Strasslach, near Munich, and Karl-Josef Kraft, Leverkusen, Germany, assignors to Maschinenfabrik Hennecke Gesellschaft mit beschrankter Haftung, Leverkusen, Germany
Filed July 26, 1968, Ser. No. 747,944
Int. Cl. B29d 7/08, 9/00
U.S. Cl. 18—4
7 Claims

ABSTRACT OF THE DISCLOSURE

Apparatus for the production of hard foam core plates having rigid cover plates or layers where the starting materials is introduced between the cover layers disposed at a vertical distance from one another which are moved continuously by a conveyor, where after the introduction of the foam material the upper plates which are connected to each other by sealing means are carried in the area between limiting foils on both sides by supporting disposed between the plates.

BACKGROUND OF THE INVENTION

The invention relates to the manufacture of hard core foam plates that are coated with layers of cover leaves, plates or foil. More in particular, the invention provides apparatus for the continuous production of hard foam plates covered with rigid cover layers of material, where the starting material is introduced between plates of material that constitute the cover layers and which are continuously moved along by a conveyor at a vertical distance or spacing from one another.

An apparatus is already known where the rigid cover layers between which a finely grained thermoplastic mass is disposed, are continuously moved between conveyors or bands, while during this movement the thermoplastic masses are heated by heating elements and are thereby heated.

An apparatus is furthermore known, by means of which hard foam plates are produced which are covered with flexible sheets or foils. These foils are introduced at the top and at the bottom into a device referred to as a double band installation, so that a liquid starting material can be introduced between them and foamed in the space defined by the foils. Likewise, the lateral sealing is effected by suitable laterally applied foils. All foils are fed from large supply rolls and are conducted and guided in a suitable manner. Such guiding, especially turning, and manipulating is not possible with rigid cover layers.

SUMMARY OF THE INVENTION

The invention is based on the fundamental problem, to provide an apparatus of the type mentioned above, by means of which hard foam plates having rigid cover sheets or layers can be made if one starts with an initial material that is introduced in liquid condition.

It is a particular object of the invention to provide an apparatus of the type aforementioned, by means of which hard foam plates on a polyurethane base covered with rigid cover layers can be produced with great accuracy.

This problem is solved in that the upper plates which are connected in a sealing manner at their abutment joints, are carried by supporting elements arranged on both sides between the plates in the area of laterally applied limiting foils after the introduction of the foam material. The supporting elements preclude that the plates which already are equally spaced from one another by a wedge, and between which the starting material is already present in liquid form, approach one another again, as a result of which the plates due to the hanging condition would have a distance from one another in vertical direction which would differ more or less from the desired and required spacing. This would result in a product which does not have the desired dimensions. It is, therefore, ascertained by means of these supporting elements that the upper plates cannot move in vertical direction, i.e., they cannot hang down, so that the spacing established between the upper and lower plates is maintained. The supporting elements are only effective until sufficient foaming has taken place and until the blown or foamed up material has taken over the carrying function. Until the foam material has become self supporting, or if it exerts a pressure against the upper plates that counteracts the gravity, supporting of the plates against this force is, of ocurse, necessary until the final hardening has taken place. The supporting is advantageously effected by the upper band of the so-called double band installation.

The supporting elements may either be stationary or they may be constructed as supporting bands or webs which rotate synchronously with the plates or with the double bands.

The supporting has to be accomplished in different ways, depending on the type of profile or outline or the final product. For example, if it is desired that the foam material which is introduced terminate laterally with the rigid cover layers, then the supporting elements must be brought out of the area between the plates before the mass of foam material is completely hardened, so that the foam pressure can still press the material laterally outwardly until final hardening takes place and to produce the desired profile.

Advantageously this is accomplished by constructing the supporting elements in the form of endless bands that are driven synchronously with the plates about rollers or pulleys, in which connection the rollers are arranged to be adjustable or displaceable out of the region of the rigid cover layers to make possible the outward displacement of the supporting elements.

Furthermore the supporting elements, respectively the supporting bands, are advantageously guided out of the space between the plates, in a manner that this operation is terminated together with the hardening of the foam material.

There may also be stationary counter bearings along the side of the supporting elements remote from the supporting elements.

If it is desired to produce an end product where the rigid cover layers project laterally beyond the foam material, then it is not necessary to bring the supporting elements out of the space between the rigid cover layers prior to the hardening.

BRIEF DESCRIPTION OF THE DRAWINGS

Further objects and advantageous features of the invention will become apparent from the following description with reference to the accompanying drawings in which

FIGS. 1A and 1B illustrate the manner in which the rigid cover plates or layers 1, which may be of gypsum, asbestos-cement, plywood, sheet metal or hard fibrous material, are fed in pairs from a lifting table by way of a roller track onto a conveyor 4 made in any suitable manner. The conveyor 4 which operates in synchronism with the double band 11 conveys the superimposed plates to the plate connecting device 5, where the upper and correspondingly the lower plates are connected with one another at their abutting ends, which may be by means of agglutinant tape, such as masking tape. The tape strips may be provided with markings which later, at the end of the production process, can be probed or scanned by means of a probe, which then guides or controls the cross cutter 15 for cutting the plates into sections at the abutment locations. It is not absolutely necessary, however, to provide such a probe, because the transverse cutter can also be controlled by a mechanical driver which, for example, may be a part or member of the conveyor 4 or co-operate with it.

Figure 1A:
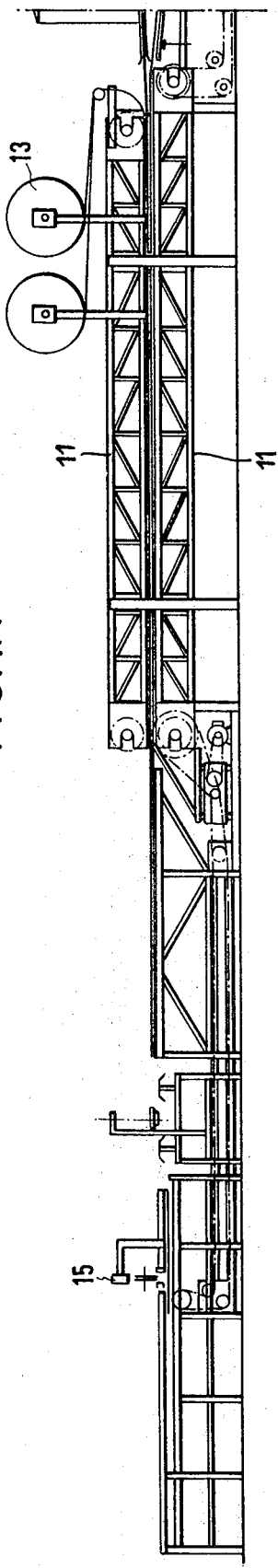
FIGS. 1A and 1B show the apparatus for the production of hard foam plates covered with rigid cover layers in a side elevational view.
Figure 1B:
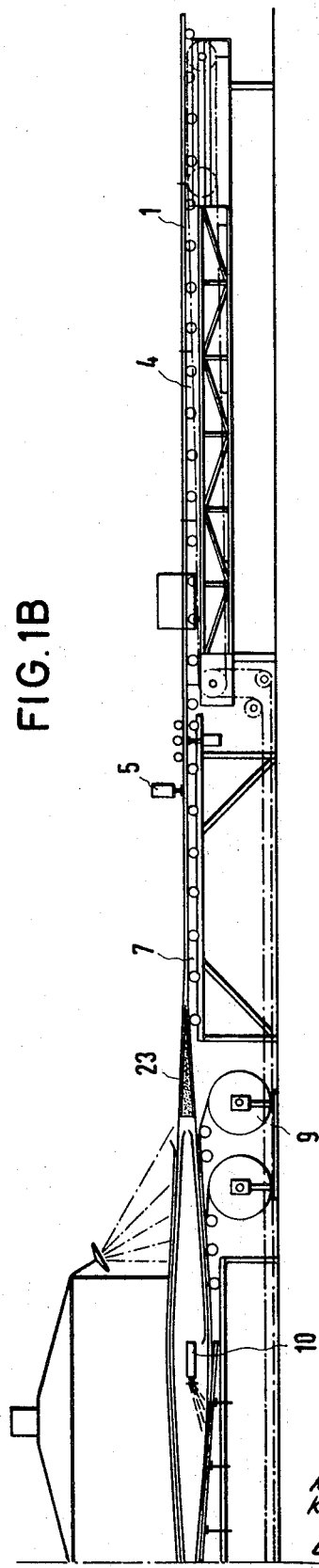

Before the web which now consists of a tight upper and a tight lower plate layer is conducted of a further conveyor arrangement 7, it is possible to introduce the foils 9 for forming a pan for the liquid mass of foam material below the plates if such a cross section is desired. Thereupon the plates are spaced from one another in the desired manner, commencing at their common plane of contact, by means of sliding wedges or rollers 23. In this manner the lower web of plates can be passed under and the upper web can be passed over a charging or feeding device 10, whereupon the web enters the double band installation in which also foils or strips 12 for the lateral sealing can be introduced if the end product is to be of the type where the use of side foils, which may be paper is required. In addition the introduction of upper and lower cover foils 13 may be provided for in order to form a connection or seal with the bottom foil 9.

Figure 2A:
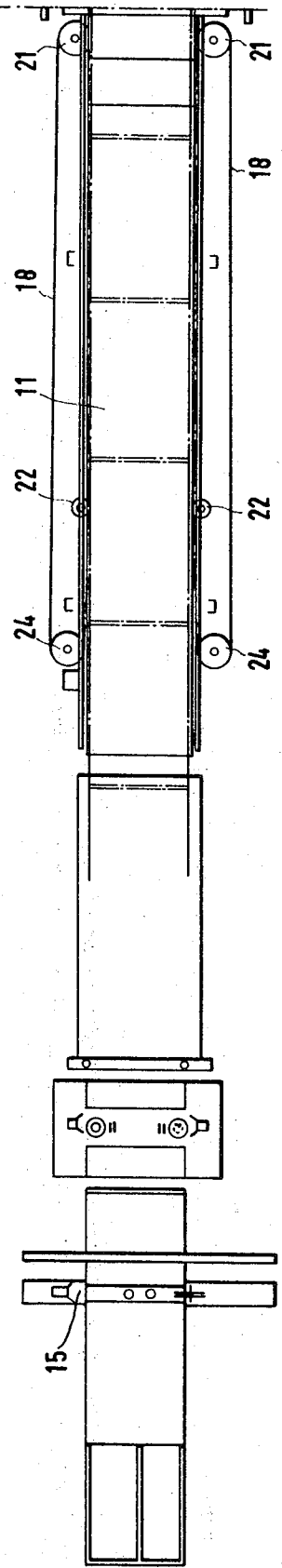
FIGS. 2A and 2B are plan views of the apparatus shown in FIGS. 1A and 1B where lateral supporting elements are provided in the region of the double band installation.
Figure 2B:
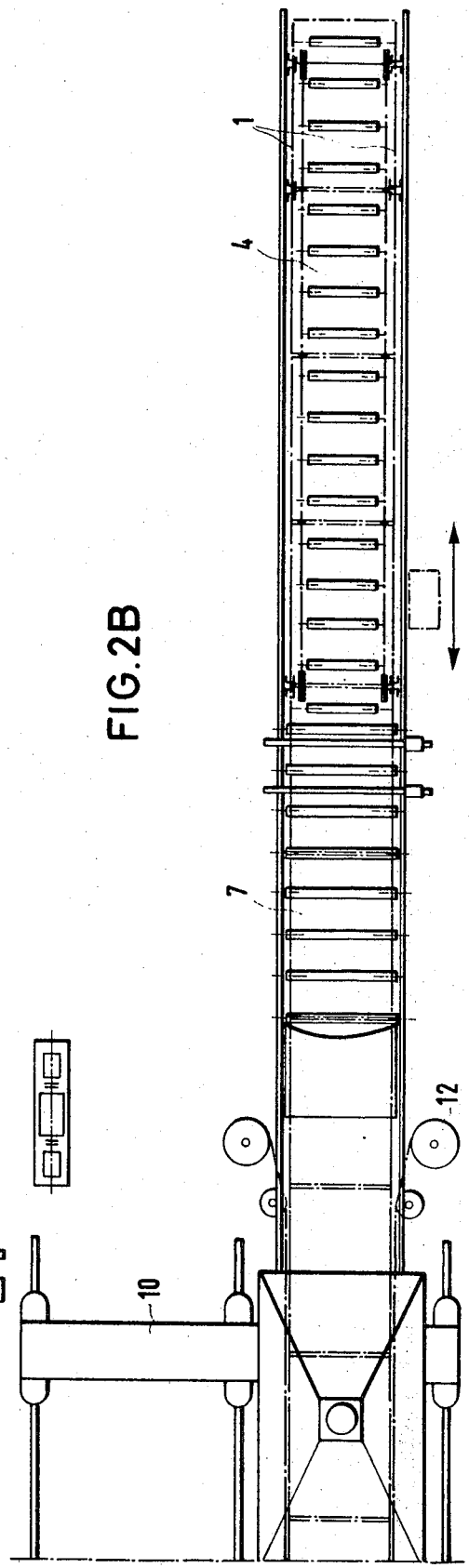
Figure 3:
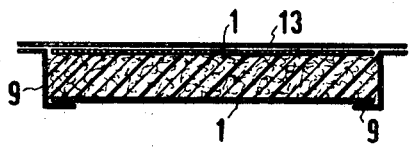
FIG. 3 is an outline or profile of a hard foam plate covered with rigid cover layers, where the foam material which has been introduced terminates laterally with the rigid cover plates.
Figure 4:
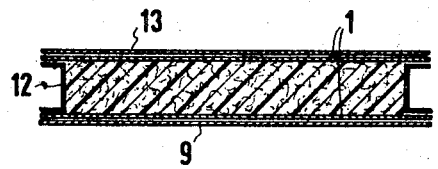
FIG. 4 is an outline of a plate similar to that of FIG. 2, from which it differs in that the mass of foam introduced does not terminate laterally with the rigid cover layers.

FIGS. 2A and 2B illustrates as one embodiment of supporting elements a supporting band or belt 18 which revolves about pulleys or rollers 21, 22, 23, and which is so arranged that it supports the upper plates 1, for example, to produce a section in accordance with FIG. 3, for the length of time required until the foam material between the plates is hardened sufficiently that supporting is no longer required, but the hardening must not have progressed to an extent that the foam pressure between the plates 1 after the supporting belts leave the space between them is no longer sufficient to press the foam mass, or strips, if lateral limiting strips 9 are provided (FIG. 3), outwardly, so that in the resulting sections the rigid sides of the cover plates register with the corresponding sides of the hard foam core. In order to absorb the lateral pressure of the foam material stationary counter bearings 20 may be arranged between rollers or pulleys 21 and 22.

The pulleys 24 may be pivotable or adjustable in such a manner that the exit of the supporting belt 18 out of the space between the cover layers 1 can be changed as to time or location. For this purpose the reversing rollers 22 can also be displaced parallel with respect to the conveying direction of the plates. In this manner a universal adjustability of the supporting belts is provided.

Figure 5:
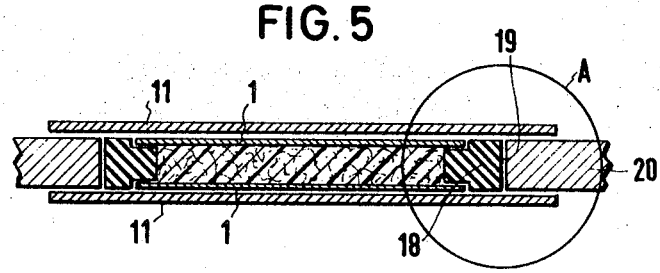
FIG. 5 is a section through the double band installation with the lateral supporting element constructed in the form of supporting bands or straps.
Figure 6:
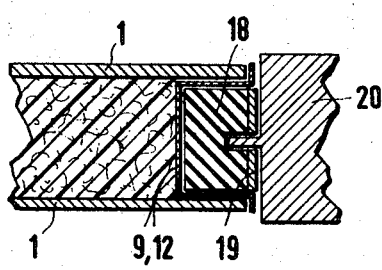
FIG. 6 is the detail A in accordance with FIG. 5, showing small features more completely.

FIGS. 5 and 6 illustrate a supporting belt 18 which is made of rubber that is vulcanized onto a steel strip or band 19. The stationary guide means 20 can simultaneously serve for the support of the belt 18 in vertical direction, which is accomplished by a suitable projection on the counter bearing 20 that extends into a groove provided in belt 18, 19.

It is evident that it is not necessary for the purpose of producing sections in accordance with FIG. 5 to guide the supporting belt 18 out of the space between the rigid cover plates 1.

Figure 7:
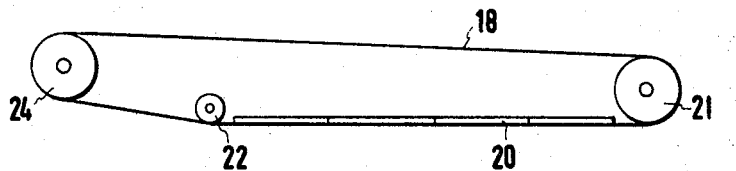
FIG. 7 is a plan view of one side of the double conveyor installation in the area where a supporting belt is provided.
Figure 7:
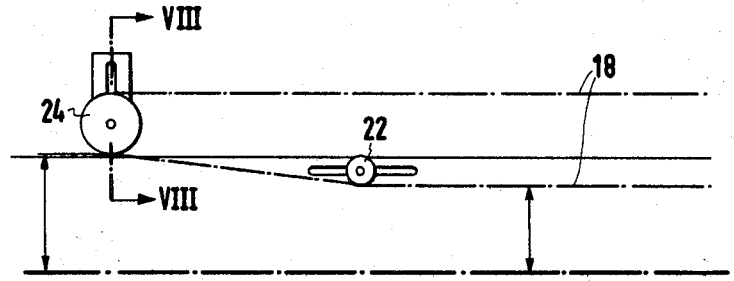

FIG. 7 illustrates the operative relationship between roller 24 and roller 22 for the purpose of guiding the supporting belt 18 out of the space between the plates 1. The direction of movement of the supporting band 18 between rollers 22 and 24 is inclined with respect to the direction of movement of the double band structure 11.

The two dimension arrows indicate the differences in distance of the supporting belt 18 from the center line of the double band structure. The distance of the pulley or roller 24, and thus of the belt 18 which runs around the roller, from the center line is greater than the corresponding distance of the pulley or roller 22 from the center line.

Figure 8:
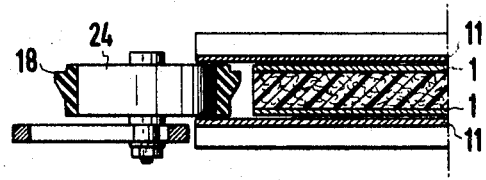
FIG. 8 is a section along line VIII–VIII in FIG. 7 drawn to enlarged scale.

FIG. 7 aslo shows that the roller 24 is displaceable perpendicularly to the conveying direction in a slot as seen in FIG. 8. Similarly roller 22 is displaceable parallel to the feeding direction in an elongated slot in order to adjust the point of time at which the withdrawing of the supporting belt from the space between the plates begins.

The foils 9, 12 and 13 are, of course, utilized in a manner depending on the desired type and configuration of the end product. For example, if the moving belt 18, 19 is suitably constructed and executed lateral cover strips can be dispensed with if it is prevented in another manner that the foam mass sticks to the belt. This can be achieved by the application of suitable chemical separating agents. At any rate, the invention is not limited to the use of any particular kind of cover or side foils.

Having now described our invention with reference to the embodiments illustrated in the accompanying drawings, we do not wish to be limited thereto, but what we desire to protect by letters patent is set forth in the appended claims.

We claim:

1. Apparatus for the continuous production of hard foam plates covered by rigid cover layers or plates sealingly connected at their adjacent ends, comprising conveyor means for continuously moving the cover plates at a vertical distance from one another, a foam supply means for introducting foam material in liquid from between the plates, a foamed plate conveyor disposed in receiving relationship to the plates discharged from the position of said foam supply means, limiting means applicable laterally on both sides between said plates adapted to prevent leakage of foam material, and supporting elements extending on both sides into the space below the upper of said plates adapted to carry the upper of said plates.

2. Apparatus in accordance with claim 1, where said supporting elements are in the form of revolving continuous belt elements movable continuously with said plates.

3. Apparatus in accordance with claim 1, comprising a section of double bands or belts with supporting elements inclined relative to the direction of conveying.

4. Apparatus in accordance with claim 2, where said supporting elements are in the form of an endless steel band and an endless rubber belt vulcanized to the steel band.

5. Apparatus in accordance with claim 2 comprising stationary counter bearings arranged on the side of said belt elements remote from the foam material.

6. Apparatus in accordance with claim 2, comprising pulleys associated with said supporting belts arranged endwise of said foamed plate conveyor, where the supporting belt pulleys at the delivery end of the conveyor are adjustable for changing the inclination.

7. Apparatus in accordance with claim 6, including intermediate pulleys between the end pulleys of said belts and means adapted to displace said pulleys parallel to the direction of conveying.

References Cited

UNITED STATES PATENTS

| | | |
|---|---|---|
| 1,465,326 | 8/1923 | Zimmer. |
| 2,866,730 | 12/1958 | Potchen et al. |
| 2,909,804 | 10/1959 | Means. |
| 3,262,151 | 7/1966 | Oxel. |

WILLIAM STEPHENSON, Primary Examiner